M. NOAKER.
WHEEL OR SULKY CULTIVATOR.
APPLICATION FILED MAR. 10, 1913.
1,215,691. Patented Feb. 13, 1917.
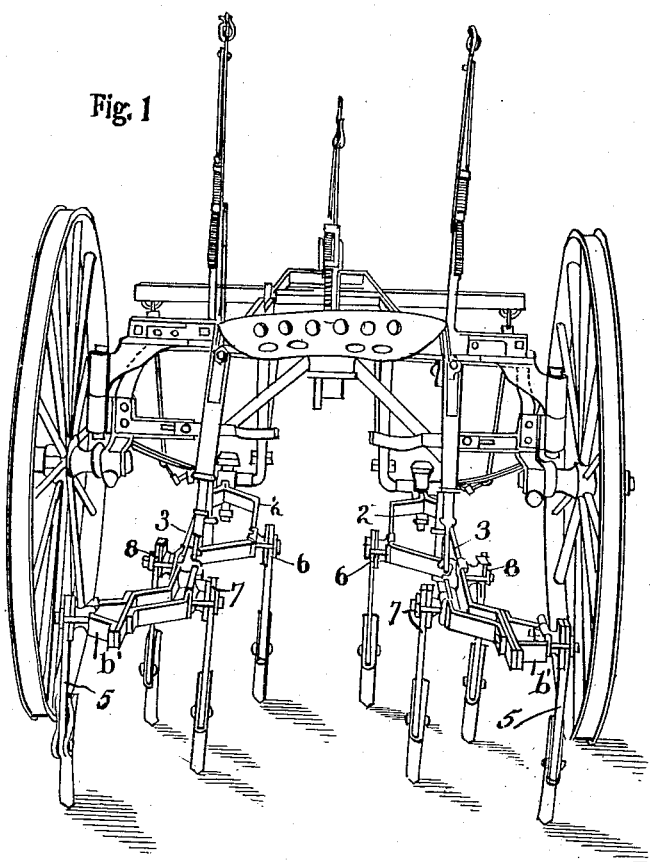
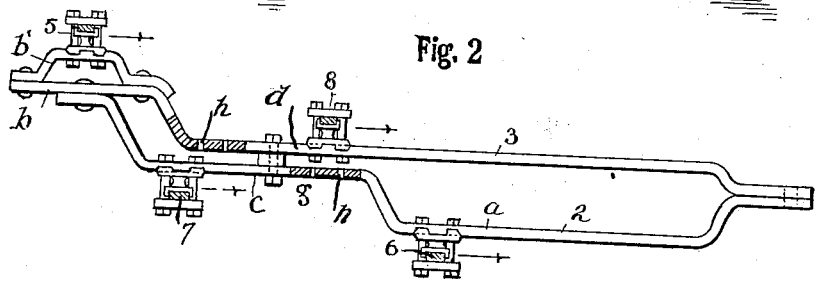
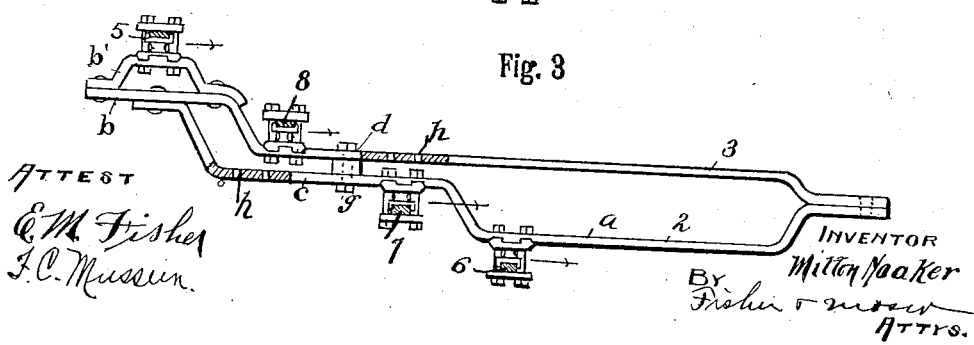

UNITED STATES PATENT OFFICE.

MILTON NOAKER, OF AKRON, OHIO, ASSIGNOR TO THE AKRON CULTIVATOR COMPANY, OF AKRON, OHIO, A CORPORATION.

WHEEL OR SULKY CULTIVATOR.

1,215,691. Specification of Letters Patent. Patented Feb. 13, 1917.

Application filed March 10, 1913. Serial No. 753,338.

*To all whom it may concern:*

Be it known that I, MILTON NOAKER, citizen of the United States, residing at Akron, in the county of Summit and State of Ohio, have invented certain new and useful Improvements in Wheel or Sulky Cultivators, of which the following is a specification.

This invention consists in an improvement in wheel or sulky cultivators which are built to employ a single gang frame on each side and constructed to make different dispositions of the shovel standards thereon according as one or another style of cultivator is wanted, all substantially as shown and described and particularly pointed out in the claims.

In the accompanying drawings, Figure 1 is a rear perspective view of a wheel or sulky cultivator provided with the improved gangs of my invention. Fig. 2 is a plan view of one of the gang frames, say from the right side, showing the shovel standards in a zig-zag relation thereon, and Fig. 3 is a plan of the same frame with the standards in a straight diagonal relation, as hereinafter fully described.

In this art as hitherto developed the gang frames or beams have been of two types especially, the straight and the zig-zag, but there was no convertibility between them and if one was used the other had to be laid aside. The gangs of the zig-zag type have had the standards which carry the teeth or shovels arranged in staggered relation say as shown in Fig. 2, while the others had the standards arranged in straight diagonal rows. The zig-zag arrangement gave a maximum of clearance between teeth, but under certain conditions of soil or work it was desirable to have the teeth arranged as they are on what is known as the low wheel straight gang diagonally. This change in arrangement of the shovel standards could not be made on any one of the old frames or beams and hence a different frame was required in order to make a single frame answer both purposes. The present invention therefore resides fundamentally in the gang frame shown herein as a new article of manufacture and which is in a sense convertible or interchangeable for both gang arrangements as may be preferred.

To these ends I have devised the said frame with a shape lengthwise which provides at least four different standard supporting portions or seats, two on each side and in different planes as to the line of travel and constructed, in this instance, with two suitable bars which are riveted or otherwise permanently secured together at their ends so as to make a unitary structure but connected by a bolt and intervening or spacing collar at $g$.

The said bars are bent here and there to obtain the desired lateral seating space as between standards and by which the widely alternate zig-zag arrangement of the shovel standards seen in Fig. 2 is made possible, as well as the straight line diagonal arrangement seen in Fig. 3. This latter is the straight gang arrangement above referred to, and the said standard supporting portions comprise the off-set $a$ in the outer bar 2, the opposite off-set $b$ at the rear end of bar 3 and the two parallel portions or spaces $c$ and $d$ respectively on the said bars near their middle.

The off-set $b$ has in addition a bracket $b'$ upon which the rear tooth standard is supported and which is necessary in the present construction in order to get the desired lateral spacing of the said tooth from the line of travel of those going before in the gang. Of course the offset $b$ might be made large enough or extend outward far enough to render this bracket unnecessary, but the bracket is preferred.

This limits the location of the said standard 5 as to position to the bar but the front standard 6 could be placed farther forward on the bar 2 if it were desired to afford more room as to either standard 7 or 8 in either of the two different arrangements shown in Figs. 2 and 3 or such others as might be made. As to this, however, the standards 5 and 6 hold the same position in both the diagrams or plans shown in Figs. 2 and 3, but the two standards 7 and 8 hold different positions in each. Thus, in Fig. 2 the standard 8 is moved forward to its advanced or forward seat on bar 3 while the otherwise opposite or companion standard 7 is moved rearward to its rear seat on bar 2. This arrangement gives the alternate staggered positions hereinbefore referred to with the maximum open space between shovels. In this order the standard 8 is brought in advance of standard 7 and causes standard 7 to work midway between the lines traversed by standards or shovels 6 and 8. By the term standard I would include the tooth or shovel it carries. On the other hand the soil or other conditions may be such as to be met best by a diagonal practically straight line disposition of the teeth, as in Fig. 3. In this case the two teeth 7 and 8 are reversed as to their order successively, the tooth 7 being advanced to its front position opposite that of tooth 8 in Fig. 2, while tooth 8 is moved back to about opposite the former position of tooth 7. In other words the positions of said teeth 7 and 8 are reversed in the gang, and in this arrangement all the teeth follow each other successively from one to the other instead of crossing back and forth as in Fig. 2.

Now, the gang frame is constructed to enable these and other changes to be made and with the same gang both arrangements are practicable and convenient. Suitable yokes, brackets and bolts may be employed to fix the standards on the bars and the said bars are provided with transverse holes $h$, in this instance, for the securing bolts. The said holes are seen in pairs in the parallel portions of the frame for standards 7 and 8 and the essential changes to get either combination in Fig. 2 or 3 are made by transferring the standards 7 and 8 to reverse positions as described.

Obviously the gang frames embody the basic novelty as the said frames can be placed on any of the wheel cultivators now in use and the old standards can be transferred to these frames.

In case the corn or other plant under cultivation has grown quite large the inner shovel standard in each gang can be removed and thus avoid possible injury to plant roots. This would leave three shovels on a side. Other dispositions of the said standards also are possible with this construction of frame.

Obviously, also, the gang frame might be variously constructed to get substantially the relations shown of the several shovels and be within the terms and the equivalent of the invention as disclosed herein, and the shovel standards likewise may be of a suitable pattern or style according to the shovel or tooth used and the effect desired on the soil.

It should have been mentioned that the two gangs shown herein are exactly alike in every particular and that they are not rights and lefts as is the rule in this class of machines. The said gangs also are invertible, so that if a given gang be used, say at the left, it can as well be used on the right by turning it over. Hence in an order for an equipment of two gangs it is only necessary to ship two out of stock and the purchaser will place one on the right and the other on the left and the work will be done. Of course the brackets or clamps for holding the cultivator standards will be placed according to the showing in Fig. 2 or in Fig. 3 as one or the other may be wanted. In any case the bracket $b'$ remains as a permanent portion of the gang.

What I claim is:

1. As a new article of manufacture, a convertible gang frame for wheel cultivators consisting of two metallic bars permanently united at both ends and variably spaced apart between their ends, and said frame provided with a relatively narrowed portion at its rear having parallel sides and each of said sides having two seats for a single interchangeable cultivator standard on each side and provided further with a single seat at the rear of said frame and a single seat on the inside thereof near its middle, whereby a straight or a zig-zag disposition of teeth can be obtained in a single gang frame.

2. A frame for convertible cultivator gangs as described, having an outwardly extending portion at its rear end provided with a bracket and a seat on said bracket for a cultivator standard, and said frame having a relatively inwardly extending portion on its inner side provided with a seat for a standard and parallel sides between said seats provided each with a pair of seats for cultivator standards, whereby a single tooth standard may be exchanged from one seat to the other in each of said pair of seats.

3. A convertible gang for wheel cultivators consisting of a frame having seats for cultivator standards in parallel lines on opposite sides at its front and rear respectively and two pairs of seats at opposite sides between said front and rear seats and relatively inward therefrom in parallel lines, the space between the two seats of one of said pairs being greater than the space between the two seats in the other pair.

4. A gang frame for wheel cultivators constructed of metallic bars bent outward at their rear ends in respect to the remainder of the frame and a bracket on said rear end provided with a seat for a cultivator standard, the outer of said bars being straight from said bend to the front end and the inner bar bent inward at about its middle parallel to the outer bar, and said frame having a contracted portion between said bends with parallel sides, a seat on said inner bar on its inward bent portion and a pair of seats on each side of the said parallel contracted portion of the frame, the spaces between occupied seats successively being substantially the same and cultivator standards supported from each of said front and rear seats and a single standard supported from each set of middle seats.

In testimony whereof I affix my signature in presence of two witnesses.

MILTON NOAKER.

Witnesses:
 CLARA MISKIMEN,
 A. RODGERS.

Copies of this patent may be obtained for five cents each, by addressing the "Commissioner of Patents, Washington, D. C."